United States Patent [19]
Cunningham et al.

[11] Patent Number: 6,057,409
[45] Date of Patent: May 2, 2000

[54] SUPERCRITICAL POLYMERIZATION PROCESSES

[75] Inventors: Michael F. Cunningham, Georgetown; Hadi K. Mahabadi, Etobicoke, both of Canada

[73] Assignee: Xerox Corporation, Stamford, Conn.

[21] Appl. No.: 08/415,384

[22] Filed: Apr. 3, 1995

[51] Int. Cl.[7] ............................... C08F 2/00; G03G 9/00; G03G 5/00
[52] U.S. Cl. ......................... 526/201; 430/108; 430/137
[58] Field of Search ........................... 526/201; 430/108

[56] References Cited

U.S. PATENT DOCUMENTS

| | | |
|---|---|---|
| 3,522,228 | 7/1970 | Fukui et al. . |
| 3,590,000 | 6/1971 | Palermiti et al. ....................... 252/62.1 |
| 4,233,387 | 11/1980 | Mammino et al. ...................... 430/137 |
| 4,748,220 | 5/1988 | Hartmann et al. . |
| 4,935,326 | 6/1990 | Creatura et al. ......................... 430/108 |
| 4,937,166 | 6/1990 | Creatura et al. ......................... 430/108 |
| 5,312,882 | 5/1994 | DeSimone et al. . |

*Primary Examiner*—David W. Wu
*Assistant Examiner*—Tanya Zalukaeva
*Attorney, Agent, or Firm*—E. D. Palallo

[57] ABSTRACT

A process for the preparation of carrier powder polymer coatings which comprises the supercritical polymerization of two monomers and surfactant in a supercritical medium.

10 Claims, No Drawings

SUPERCRITICAL POLYMERIZATION PROCESSES

BACKGROUND OF THE INVENTION

This invention is generally directed to developer compositions, and more specifically, the present invention relates to developer compositions with coated carrier particles prepared by dry powder processes, and wherein supercritical fluids such as carbon dioxide is selected. In embodiments of the present invention, the carrier particles are comprised of a core with coating thereover, and which coating contains a surfactant to, for example, provide contrasting triboelectric carrier charging. In embodiments, the present invention relates to carrier particles and processes thereof, which processes comprise the preparation of polymer like poly(methacrylate) particles by supercritical polymerization in a medium, such as carbon dioxide, and wherein a surfactant, such as substituted polyacrylates, is selected for the reaction mixture. More specifically, in embodiments the present invention relates to the polymerization of a monomer like methyl methacrylate in supercritical carbon dioxide in the presence of a surfactant, and wherein small size carrier coatings, such as submicron to micron polymethylmethacrylate (PMMA) carrier coatings with a size, for example, of from about 0.05 to about 5 microns, and more specifically, from about 0.05 to about 1 micron. The surfactant selected for the aforementioned polymerization is believed to stabilize the particles during polymerization, and such surfactant enables the preselection of the triboelectric charge on the carrier particles comprised of a core and the polymers obtained with the invention processes. The carrier polymers thus can be comprised of a polymer like PMMA, and thereover a controlled amount of contrasting triboelectric surfactant. Moreover, in another aspect of the present invention the carrier particles are prepared by a dry coating process wherein a mixture polymer obtained with covered surfactant is applied to a carrier core enabling insulating particles with relatively constant conductivity parameters; and also wherein the triboelectric charge on the carrier can be varied depending on the coating selected. Specifically, therefore, with the carrier compositions and process of the present invention there can be formulated developers with selected triboelectric charging characteristics and/or conductivity values in a number of different combinations. Developer compositions comprised of the carrier particles prepared by the dry coating process of the present invention are useful in electrostatographic or electrophotographic imaging systems, especially xerographic imaging and printing processes. Additionally, developer compositions comprised of substantially insulating carrier particles prepared in accordance with the process of the present invention are useful in imaging methods wherein relatively constant conductivity parameters are desired. Furthermore, in the aforementioned imaging processes the triboelectric charge on the carrier particles can be preselected depending on the polymer composition applied to the carrier core. With the processes of the present invention, costly washing and drying steps can be avoided or minimized, environmental concerns such as the discarding of waste solvent can be eliminated or minimized, carrier morphologies can be controlled, and the carrier coating can include conductive components, such as carbon black, metal oxides like tin oxide, and the like therein in an amount, for example, of from about 20 to about 45 weight percent to obtain carrier particles with certain conductivities.

The electrostatographic process, and particularly the xerographic process, is well known. This process involves the formation of an electrostatic latent image on a photoreceptor, followed by development, and subsequent transfer of the image to a suitable substrate. Numerous different types of xerographic imaging processes are known wherein, for example, insulative developer particles or conductive toner compositions are selected depending on the development systems used. Moreover, of importance with respect to the aforementioned developer compositions is the appropriate triboelectric charging values associated therewith, as it is these values that enable continued constant developed images of high quality and excellent resolution.

Additionally, carrier particles for use in the development of electrostatic latent images are described in many patents including, for example, U.S. Pat. No. 3,590,000. These carrier particles may be comprised of various cores, including steel, with a coating thereover of fluoropolymers; and terpolymers of styrene, methacrylate, and silane compounds. Many of the commercial carrier coatings can deteriorate rapidly, especially when selected for a continuous xerographic process where the entire coating may separate from the carrier core in the form of chips or flakes, and fail upon impact, or abrasive contact with machine parts and other carrier particles. These flakes or chips, which cannot generally be reclaimed from the developer mixture, have an adverse effect on the triboelectric charging characteristics of the carrier particles thereby providing images with lower resolution in comparison to those compositions wherein the carrier coatings are retained on the surface of the core substrate. Further, another problem encountered with some prior art carrier coatings resides in fluctuating triboelectric charging characteristics, particularly with changes in relative humidity. The aforementioned modification in triboelectric charging characteristics provides developed images of lower quality, and with background deposits.

There are also illustrated in U.S. Pat. No. 4,233,387, the disclosure of which is totally incorporated herein by reference, coated carrier components for electrostatographic developer mixtures comprised of finely divided toner particles clinging to the surface of the carrier particles. Specifically, there is disclosed in this patent coated carrier particles obtained by mixing carrier core particles of an average diameter of from between about 30 microns to about 1,000 microns with from about 0.05 percent to about 3.0 percent by weight, based on the weight of the coated carrier particles, of thermoplastic resin particles. The resulting mixture is then dry blended until the thermoplastic resin particles adhere to the carrier core by mechanical impaction, and/or electrostatic attraction. Thereafter, the mixture is heated to a temperature of from about 320° F. to about 650° F. for a period of 20 minutes to about 120 minutes, enabling the thermoplastic resin particles to melt and fuse on the carrier core. While the developer and carrier particles prepared in accordance with the process of this patent, the disclosure of which has been totally incorporated herein by reference, are suitable for their intended purposes, the conductivity values of the resulting particles are not constant in all instances, for example, when a change in carrier coating weight is accomplished to achieve a modification of the triboelectric charging characteristics; and further, with regard to the '387 patent, in many situations carrier and developer mixtures with only specific triboelectric charging values can be generated when certain conductivity values or characteristics are contemplated. With the invention of the present application, the conductivity of the resulting carrier particles are substantially constant, and moreover, the triboelectric values can be selected to vary significantly, for example, from less than −15 microcoulombs per gram to greater than −70 microcoulombs per gram, depending on the polymer mixture selected for affecting the coating process. Also, illustrated in Creatura et al. U.S. Pat. Nos. 4,937,166, and 4,935,326, the disclosures of which are totally incorporated herein by reference, is a carrier composition comprised of a core with a coating thereover comprised of a mixture of first and second polymers that are not in close proximity thereto in the triboelectric series, and which carrier can be prepared by dry coating processes.

With further reference to the prior art, carriers obtained by applying insulating resinous coatings to porous metallic carrier cores using solution coating techniques are undesirable from many viewpoints. For example, the coating material will usually reside in the pores of the carrier cores, rather than at the surfaces thereof, and therefore, is not available for triboelectric charging when the coated carrier particles are mixed with finely divided toner particles. Attempts to resolve this problem by increasing the carrier coating weights, for example, to as much as 3 percent or greater to provide an effective triboelectric coating to the carrier particles necessarily involves handling excessive quantities of solvents, and further, usually these processes result in low product yields. Also, solution coated carrier particles when combined and mixed with finely divided toner particles provide in some instances triboelectric charging values which are too low for many uses.

Thus, for example, there can be formulated in accordance with the invention of the present application developers with conductivities of from about $10^{-6}$ mho $(cm)^{-1}$ to about $10^{-17}$ mho $(cm)^{-1}$ as determined in a magnetic brush conducting cell, and triboelectric charging values of from about a −8 to about −80 microcoulombs per gram on the carrier particles as determined by the known Faraday Cage technique. Thus, the developers of the present invention can be formulated with constant conductivity values with different triboelectric charging characteristics by, for example, maintaining the same coating weight on the carrier particles and changing the polymer coating ratios. Similarly, there can be formulated developer compositions wherein constant triboelectric charging values are achieved and the conductivities are altered by retaining the polymer ratio coating constant and modifying the coating weight for the carrier particles.

In copending patent application U.S. Ser. No. 314,745, the disclosure of which is totally incorporated herein by reference, there is illustrated a process comprising subjecting a toner comprised of resin and pigment to a particle size reduction in an organic fluid; accomplishing supercritical extraction thereof with, for example, carbon dioxide; and isolating said toner.

Also, reference is made to the following copending patent applications filed concurrently herewith, the disclosures of which are totally incorporated herein by reference, U.S. Ser. No. 415,261 U.S. Pat. No. 5,514,512 entitled Coated Carrier Particles, U.S. Ser. No. 415,278 U.S. Pat. No. 5,514,513 entitled Carrier Powder Supercritical Polymers, U.S. Ser. No. 415,281 U.S. Pat. No. 5,514,514 entitled Carrier Coatings and Processes, and U.S. Ser. No. 415,391 U.S. Pat. No. 5,516,618 entitled Carrier Coatings With Fillers.

SUMMARY OF THE INVENTION

Examples of objects of the present invention include:

It is an object of the present invention to provide toner and developer compositions with carrier particles containing a polymer coating.

In another object of the present invention there are provided dry coating processes for generating carrier particles of substantially constant conductivity parameters.

In yet another object of the present invention there are provided dry coating processes for generating carrier particles of substantially constant conductivity parameters, and a wide range of preselected triboelectric charging values.

Moreover, in another object of the present invention there are provided carrier particles, and a coating thereover prepared by the supercritical polymerization of a monomer in the presence of a surfactant.

Additionally, in another object of the present invention there are provided polymerization processes in supercritical carbon dioxide liquid and wherein costly downstream processing operations can be eliminated or minimized for the preparation of submicron carrier polymer coatings, and wherein after polymerization is completed the reactor selected is vented allowing discrete polymer particles that do not require additional processing.

Further, in another object of the present invention there are provided carrier particles and a copolymer coating thereover comprised of, for example, a copolymer of methylmethacrylate and fluoroacrylates, or fluoromethylacrylates, and which copolymers are prepared by polymerization of the appropriate monomers in a medium, such as supercritical carbon dioxide. The ratio amount of methylmethacrylate to fluoropolymer can be varied to control the triboelectric charge on the carrier, and particle size can also be controlled by surfactant concentration, the monomer ratios, and the thermodynamic properties of the supercritical medium.

In still a further object of the present invention there are provided carrier particles of insulating characteristics comprised of a core with a coating thereover generated from supercritical carbon dioxide methods.

Further, in an additional object of the present invention there are provided carrier particles comprised of a core with a coating thereover generated by supercritical carbon dioxide methods, and wherein the triboelectric charging carrier values are from about −10 microcoulombs to about −70 microcoulombs per gram at the same coating weight.

In another object of the present invention there are provided methods for the development of electrostatic latent images wherein the developer mixture comprises carrier particles with a coating thereover.

Another object of the present invention relates to carrier powder coating with a small size of, for example, 0.05 to about 5 microns, and wherein the surfactant selected enables tailoring of the triboelectric carrier charge.

Also, in another object of the present invention there are provided positively charged toner compositions, or negatively charged toner compositions having admixed therewith carrier particles with a coating thereover.

These and other objects of the present invention are accomplished by providing developer compositions comprised of toner particles, and carrier particles prepared by a powder coating process; and wherein the carrier particles are comprised of a core with a coating thereover prepared by supercritical carbon dioxide methods. More specifically, the present invention relates to processes for the preparation of polymers, such as poly(methylmethacrylate), by supercritical polymerization in a medium, such as carbon dioxide, and wherein a stabilizing surfactant is included in the reaction mixture. Therefore, for example, methyl methacrylate can be polymerized in the presence of a stabilizing surfactant, and wherein the polymerization is accomplished in supercritical carbon dioxide, or other supercritical fluids, such as ethane, propane, butane, pentane, nitrous oxide, dichlorofluoromethane or sulfur hexafluoride, to enable polymethylmethacrylate with a surfactant thereover. On completion of the aforementioned reaction, the reactor can be vented, and there remains discrete PMMA particles with a surfactant coating thereover, and which particles are in embodiments submicron in size. With further respect to the processes of the present invention, the monomer selected, such as methyl methacrylate, is soluble in the supercritical solvent, such as carbon dioxide, and the polymer obtained, such as PMMA, is substantially insoluble in the supercritical solvent. When polymerization is initiated, the polymer particles, such as PMMA particles, will begin to precipitate from the solution reaction mixture, and which particles contain the surfactant coating thereover. Particle size of the polymer obtained can be controlled by surfactant concentration, and by controlling the thermodynamic properties of the supercritical medium, such as the reactor temperature, and the reactor pressure. The surfactant coating can be selected to tailor the triboelectric charging characteristics of the carrier particles, thus, for example, fluoroacrylates, or fluoromethacrylates will provide negative carrier triboelectric charging, for example from −10 to −80 µcoul/gram, to contrast the positive triboelectric charging of the PMMA. Also, by adjusting the ratio of the fluoropolymer surfactant to the PMMA, the tribo level of the resulting coated carrier can be tailored, or modified in a preselected manner as follows, for example.

| % Surfactant | % PMMA | Tribo ($\mu$coul/g) |
|---|---|---|
| 0 | 100 | 35 |
| 2 | 98 | 17 |
| 5 | 95 | −10 |
| 10 | 90 | −28 |
| 30 | 70 | −72 |

The present invention in embodiments is directed to the preparation of polymers with surfactant thereover by charging into a high pressure steel reactor about 10 to about 50 weight/volume (w/v) percent of a monomer, such as methyl methacrylate, about 0.05 to about 5 w/v percent of initiator, such as azobisisobutyronitrile, about 0 to 2.5 w/v percent of crosslinking agent, such as divinylbenzene, together with about 1 to about 15 w/v percent of a surfactant, such as poly(perfluorooctylmethacrylate), agitating the reactor at from about 50 to about 500 rpm, pressurizing the reactor to about 50 to about 300 bars with a supercritical fluid, such as carbon dioxide; heating the reactor to from about 50 to about 250° C. for about 3 to about 15 hours to effect polymerization; cooling the reactor to from about 10 to about 40° C., venting the reactor to release the supercritical fluid, and discharging the reactor contents of polymer particles of about 0.05 to about 5 microns in diameter; possessing a weight average molecular weight of about 50,000 to about 5,000,000 and more preferably about 200,000 to about 1,500,000, and containing a layer of surfactant with a thickness of about 0.01 to about 1.5 microns on the particle surface. The composition of the resulting polymer product particles is about 60 percent to about 98 percent of polymer derived from polymerization of the added monomer, and about 2 percent to 40 percent surfactant. Optionally, the reactor can be flushed with supercritical carbon dioxide three to ten times prior to discharging the polymer particles, which removes the surfactant layer on the particle surface to yield a product that is a polymer particle without a surfactant covering. The product size can be determined my known measurement techniques such as scanning electron microscopy or by using a device such as a Coulter LS-230 particle sizer. Molecular weight of the polymer can be determined by gel permeation chromatography.

Embodiments of the present invention include a process for the preparation of carrier powder polymer coatings, which comprises the supercritical polymerization of a monomer and surfactant in a supercritical medium; a process wherein the polymer is prepared by charging into a high pressure steel reactor about 10 to about 50 w/v percent of a monomer, about 0.05 to about 5 w/v percent of initiators, about 0 to about 2.5 w/v percent of crosslinking agents, together with about 1 to about 15 w/v percent of a surfactant, agitating the reactor contents at from about 50 to 500 rpm, pressurizing the reactor to from about 50 to 300 bars with a supercritical fluid, heating the reactor to from about 50 to about 250° C. for from about 3 to about 15 hours to effect polymerization, cooling the reactor to from about 10 to about 40° C., venting the reactor to release the supercritical fluid, and discharging the reactor contents comprised of polymer particles of about 0.05 to 5 microns in diameter, and with a weight average molecular weight of from about 50,000 to about 5,000,000, and which polymer contains thereon a layer of surfactant with a thickness of from about 0.01 to 1.5 microns; a process for the preparation of carrier particles, which comprises admixing a carrier core with a polymerisurfactant product that forms a coating on the carrier core, and which coating is obtained by a process which comprises the supercritical polymerization of a monomer and surfactant in a supercritical medium; a process for the preparation of carrier powder polymer coatings, which comprises the supercritical polymerization of two monomers and surfactant in a supercritical medium; a process for the preparation of carrier powder polymer coatings which comprises the supercritical polymerization of a monomer and surfactant in a supercritical medium, and thereafter adding thereto a second monomer and initiator, and polymerizing the second monomer; a process for the preparation of carrier powder polymer coatings, which comprises the supercritical polymerization of a monomer and surfactant in a supercritical medium to form a porous polymer, and thereafter adding thereto a second polymer, and which second polymer is incorporated into the porous polymer; and a process for the preparation of carrier powder polymer coatings, which comprises the supercritical polymerization of a monomer and surfactant in a supercritical medium to form a porous polymer, and thereafter adding thereto a conductive filler.

Examples of monomers selected for the processes of the present invention, and which monomers are selected in various effective amounts, such as for example from about 60 percent to about 98 percent of the polymer product, include known monomers, such as acrylates, methylmethacrylates, styrenes, styrene copolymers, and the like.

Examples of surfactants selected for the processes of the present invention, and which surfactants are selected, for example, in amounts of from about 2 percent to about 40 percent of the final product, include substituted polyacrylates, substituted polymethylacrylates with the substituents being hydrophobic such as fluorinated alkyl groups. Examples of such polymers include poly(trifluoroethylacrylate), poly(trifluoroethylmethacrylate), poly(pentafluorophenylacrylate), poly(pentafluorophenylmethacrylate), poly(hexafluoroisopropylacrylate), poly(hexafluoroisopropylmethacrylate), poly(tetrafluoropropylacrylate), poly(tetrafluoropropylmethacrylate), poly (perfluorooctylacrylate), poly(perfluorooctylmethacrylate), poly(dodecafluoroheptylacrylate), poly(dodecafluoroheptylmethacrylate), poly(hexafluorobutylacrylate), poly(hexafluorobutylmethacrylate), poly(heptadecafluorodecylacrylate), and poly(heptadecafluorodecylmethacrylate). "Stabilizing" the polymer, such as PMMA, refers in embodiments to the surfactant acting as a protective colloid to prevent the polymer, and/or other particles from aggregating or coalescing during polymerization.

Embodiments of the present invention include the supercritical preparation of copolymer particles with a surfactant thereover where one of the monomers in the copolymer is methylmethacrylate, ethylmethacrylate or styrene, and the second monomer in the copolymer is a fluorinated monomer, for example fluorinated methacrylates, vinylidene fluoride or tetrafluoroethylene that enables the alteration of the carrier triboelectric charging characteristics as illustrated in the Creatura et. al U.S. patents mentioned hereinbefore. The present invention in embodiments is directed to the preparation of copolymers with surfactant thereover by charging into a high pressure steel reactor about 10 to 50 w/v percent of a monomer, such as methyl methacrylate, about 10 to 50 w/v percent of a second monomer that is fluorinated, about 0.0 to 5 w/v percent of initiators such as azobisisobutyronitrile, about 0 to 2.5 w/v percent of crosslinking agents such as divinylbenzene, together with 1 to 15 w/v percent of a surfactant such as poly(perfluorooctylmethacrylate), agitating the reactor from about 50 to 500 rpm, pressurizing the reactor from about 50 to 300 bars with a supercritical fluid such as carbon dioxide, heating the reactor to about 50 to 250° C. for about 3 to 15 hours to effect polymerization, cooling the reactor to about 10 to 40° C., venting the reactor to release the supercritical fluid, and discharging the reactor contents, which are comprised of copolymer particles of about 0.05 to 5 microns in diameter, possessing a weight average molecular weight of about 50,000 to 5,000,000 and more preferably 200,000 to 1,500,000, containing a layer of surfactant with a thickness of about 0.01 to 1.5 microns on the particles surface. The composition of the particles is about 60 percent to 98 percent of copolymer derived from polymerization of the two monomers, and about 2 percent to 40 percent surfactant. Optionally, the reactor can be flushed with supercritical carbon dioxide three to ten times prior to discharging the copolymer particles, which removes the surfactant layer on the particle surface to yield a product, that is a copolymer particle without a surfactant covering. The product size can be determined by known measurements techniques, such as scanning electron microscopy or by using a device such as a Coulter LS-230 particle sizer. Molecular weight of the copolymer can be determined by gel permeation chromatography.

Embodiments of the present invention include the supercritical preparation of polymer particles with a surfactant thereover as illustrated herein, and subsequently adding thereto a second monomer, that is insoluble in the polymer, such as PMMA, and initiator, followed by polymerization, and wherein the second monomer could be vinylidene fluoride, enabling the formation of KYNAR®, tetrafluoroethylene, enabling the generation of TEFLON®, fluorinated methacrylates or acrylates, and the like. Adjusting the ratio of PMMA with surfactant to the second polymer like KYNAR® enables the alteration of the carrier triboelectric charging characteristics as illustrated in the Creatura et. al U.S. patents mentioned hereinbefore. The present invention in embodiments is directed to the preparation of polymers with surfactant thereover by charging into a high pressure steel reactor about 10 to 50 w/v percent of a monomer such as methyl methacrylate, about 0.05 to 5 w/v percent of initiator such as azobisisobutyronitrile, about 0 to 2.5 w/v percent of crosslinking agent such as divinylbenzene, together with about 1 to 15 w/v percent of a surfactant such as poly(perfluorooctylmethacrylate); agitating the reactor to about 50 to 500 rpm; pressurizing the reactor from about 50 to 300 bars with a supercritical fluid such as carbon dioxide; heating the reactor to about 50 to 250° C. for about 3 to 15 hours to effect polymerization; adding about 10 to 50 w/v percent of a second monomer that is fluorinated and 0.05 to 5 w/v percent initiator whereby the second monomer and initiator are absorbed into the existing polymer particles; continuing the polymerization for 3 to 10 hours to polymerize the second monomer; cooling the reactor to about 10 to 40° C.; venting the reactor to release the supercritical fluid, and discharging the reactor content's which are comprised of particles of about 0.05 to 5 microns in diameter, with a weight average molecular weight of about 50,000 to 5,000,000 and more preferably about 200,000 to 1,500,000, and containing a layer of surfactant with a thickness of about 0.01 to 1.5 microns on the particles surface. The composition of the particles is, for example, about 60 percent to 98 percent of a homogeneous polymer blend of two homopolymers derived from each of the two added monomers, and about 2 percent to 40 percent of surfactant. Optionally, the reactor can be flushed with supercritical carbon dioxide three to ten times prior to discharging the polymer particles, which removes the surfactant layer on the particle surface to yield a product that is a polymer particle without a surfactant covering. The product size can be determined my known measurement techniques, such as scanning electron microscopy, or by using a device such as a Coulter LS-230 particle sizer. Molecular weight of the polymer can be determined by gel permeation chromatography.

Also, embodiments of the present invention include the preparation of porous polymer products by supercritical polymerization in a media, such as carbon dioxide as illustrated herein, and wherein the polymer product, such as PMMA with surfactant coating, is filled with a second contrasting polymer to, for example, subsequently enable carrier particles with altered triboelectric charging characteristics when the two polymers are coated on a carrier core such as steel. Thus, for example, submicron particles of a second polymer like KYNAR® can be contacted with and introduced into the formed porous polymer of, for example, PMMA with surfactant layer. The present invention in embodiments is directed to the preparation of polymers with surfactant thereover by charging into a high pressure steel reactor about 10 to 50 w/v percent of a monomer such as methyl methacrylate, about 0.05 to 5 w/v percent of initiators such as azobisisobutyronitrile, about 0 to 2.5 w/v percent of crosslinking agents, such as divinylbenzene, together with 1 to 15 w/v percent of a surfactant, such as poly(perfluorooctylmethacrylate); agitating the reactor to about 50 to 500 rpm; pressurizing the reactor to from about 50 to 300 bars with a supercritical fluid such as carbon dioxide; heating the reactor to about 50 to 250° C. for about 3 to 15 hours to effect polymerization; adding about 10 to 50 w/v percent of a fluorinated polymer with a particle diameter of from about 0.05 to 2 microns; and mixing for 2 to 5 hours to enable the added fluoropolymer to be absorbed into the pores of existing polymer particles; cooling the reactor to about 10 to 40° C.; venting the reactor to release the supercritical fluid; and discharging the reactor contents which are comprised of polymer particles of about 0.05 to 5 microns in diameter with a weight average molecular weight of about 50,000 to 5,000,000 and more preferably 200,000 to 1,500,000, containing a layer of surfactant with a thickness of about 0.01 to 1.5 microns on the polymer surface. The composition of the particles is, for example, from about 60 percent to 98 percent of a blend of two homopolymers, one of which is a fluoropolymer, containing from about 5 to 50 percent of the fluorinated polymer, in which the fluoropolymer particles reside inside the pores of, for example, the PMMA particles prepared by supercritical polymerization, and about 2 percent to 40 percent of surfactant. Optionally, the reactor can be flushed with supercritical carbon dioxide three to ten times prior to discharging the polymer particles, which removes the surfactant layer on the particle surface to yield a product, that is a polymer particle without a surfactant covering. The product size can be determined by known measurements techniques, such as scanning electron microscopy or by using a device such as a Coulter LS-230 particle sizer. Molecular weight of the polymer can be determined by gel permeation chromatography. Alternatively, products with the same composition can be prepared by charging into a high pressure steel reactor about 10 to 50 w/v percent of a monomer such as methyl methacrylate, about 0.05 to 5 w/v percent of initiators such as azobisisobutyronitrile, about 0 to 2.5 w/v percent of crosslinking agents such as divinylbenzene, together with 1 to 15 w/v percent of a surfactant such as poly(perfluorooctylmethacrylate); agitating the reactor at from about 50 to 500 rpm, pressurizing the reactor to from about 50 to 300 bars with a supercritical fluid such as carbon dioxide; heating the reactor to about 50 to 250° C. for about 3 to 15 hours to effect polymerization; cooling the reactor to about 10 to 40° C.; venting the reactor to release the supercritical fluid, and discharging the reactor contents; adding to the product particles an equal weight of a fluorinated polymer in a latex dispersion with a particle diameter of from about 0.05 to 2 microns; and mixing for 2 to 5 hours to permit the fluoropolymerto be absorbed into the pores of existing polymer particles. The polymer particles resulting are comprised of about 60 percent to 98 percent of a blend of two homopolymers containing from about 5 to 50 percent of the fluorinated polymer, and wherein the fluoropolymer particles reside inside the pores of, for example, PMMA particle prepared by supercritical polymerization, and about 2 percent to 40 percent of surfactant. These particles can then be removed from the latex by, for example, centrifugation or filtration, and dried by, for example, fluid bed drying or vacuum drying. Carrier particles can then be prepared as illustrated herein and in the Creatura et al. U.S. patents mentioned herein, and wherein the carrier core can be dry coated with from 10 to about 90 percent of the first polymer with surfactant coating, such as PMMA with surfactant coating, and from about 90 to about 10 weight percent of the second polymer of, for example, KYNAR®.

Moreover, in embodiments the present invention relates to the preparation of porous polymer products by supercritical polymerization in a media, such as carbon dioxide as illustrated herein, and wherein the polymer product, such as PMMA with surfactant coating, is filled with submicron conductive filler, such as carbon black, metal oxides like tin oxide, and the like in an amount of from about 20 to about 50 weight percent and which filler can adjust the conductivity of the carrier particles generated with the aforementioned prepared composite. The present invention in embodiments is directed to the preparation of polymers with surfactant thereover by charging into a high pressure steel reactor about 10 to 50 w/v percent of a monomer such as methyl methacrylate, about 0.05 to 5 w/v percent of initiators such as azobisisobutyronitrile, about 0 to 2.5 w/v percent crosslinking agents such as divinylbenzene, together with 1 to 15 w/v percent of a surfactant such as poly(perfluorooctylmethacrylate); agitating the reactor from about 50 to 500 rpm; pressurizing the reactor to from about 50 to 300 bars with a supercritical fluid such as carbon dioxide; heating the reactor to about 50 to 250° C. for about 3 to 15 hours to effect polymerization; adding about 10 to 50 w/v percent of a submicron conductive filler, such as carbon black or metal oxides such as tin oxide, and mixing for 2 to 5 hours to permit the conductive filler to be absorbed into the pores of existing polymer particles; cooling the reactor to about 10 to 40° C.; venting the reactor to release the supercritical fluid; and discharging the reactor contents, which contents are comprised of polymer particles of about 0.05 to 5 microns in diameter, with a weight average molecular weight of about 50,000 to 5,000,000 and more preferably 200,000 to 1,500,000, and containing a layer of surfactant with a thickness of about 0.01 to 1.5 microns on the particle surface. The composition of the particles is about 60 percent to 98 percent of a blend of polymers and conductive filler containing from about 5 to 45 percent of the conductive filler, and in which the conductive filler resides inside the pores of, for example, the PMMA particle prepared by supercritical polymerization, and about 2 percent to 40 percent of surfactant. Optionally, the reactor can be flushed with supercritical carbon dioxide three to ten times prior to discharging the polymer particles, which removes the surfactant layer on the particle surface to yield a product, that is a polymer particle containing conductive filler without a surfactant covering. The product size can be determined my known measurement techniques such as scanning electron microscopy or by using a device such as a Coulter LS-230 particle sizer. Molecular weight of the polymer can be determined by gel permeation chromatography. Alternatively, particles with the same composition can be prepared by charging into a high pressure steel reactor about 10 to 50 w/v percent of a monomer such as methyl methacrylate, about 0.05 to 5 w/v percent of initiators, such as azobisisobutyronitrile, about 0 to 2.5 w/v percent of crosslinking agents, such as divinylbenzene, together with 1 to 15 w/v percent of a surfactant, such as poly(perfluorooctylmethacrylate); agitating the reactor from about 50 to 500 rpm; pressurizing the reactor from about 50 to 300 bars with a supercritical fluid, such as carbon dioxide; heating the reactor to about 50 to 250° C. for about 3 to 15 hours to effect polymerization; cooling the reactor to about 10 to 40° C.; venting the reactor to release the supercritical fluid, and discharging the reactor contents; adding to the product particles an equal weight of a submicron conductive filler in a dispersion of, for example, water; and mixing for 2 to 5 hours so that the conductive filler is absorbed into the pores of existing polymer particles. The polymer product particles are comprised of about 60 percent to 98 percent of a blend of polymer containing from about 5 to 45 percent of the conductive filler, and wherein the conductive filler particles reside inside the pores of, for example, the PMMA particle obtained by supercritical polymerization, and about 2 percent to 40 percent of surfactant. These particles can then be removed from the dispersion by, for example, centrifugation or filtration, and dried by, for example, fluid bed drying or vacuum drying. Carrier particles with a conductivity range of $10^{-6}$ to $10^{-12}$ mho-cm$^{-1}$ can be prepared as illustrated herein and the Creatura et al. U.S.

patents mentioned herein, and wherein the carrier core contains a polymer coating with a conductive filler therein, such as PMMA/surfactant with carbon black therein.

The carrier particles selected can be prepared by mixing low density porous magnetic, or magnetically attractable metal core carrier particles with from, for example, between about 0.05 percent and about 3 percent by weight, based on the weight of the coated carrier particles, of the polymer with surfactant coating obtained as indicated herein, or other polymer products obtained with the invention processes, until adherence thereof to the carrier core by mechanical impaction or electrostatic attraction; heating the mixture of carrier core particles and polymer to a temperature, for example, of between from about 200° F. to about 550° F. for a period of from about 10 minutes to about 60 minutes enabling the polymer to melt and fuse to the carrier core particles; cooling the coated carrier particles; and thereafter, classifying the obtained carrier particles to a desired particle size of about 50 to 250 microns. Therefore, the aforementioned carrier compositions can be comprised of known core materials including iron with a dry polymer coating thereover. Subsequently, developer compositions of the present invention can be generated by admixing the aforementioned carrier particles with a toner composition comprised of resin particles and pigment particles.

Various suitable solid core carrier materials can be selected providing some of the objectives of the present invention are obtained. Characteristic core properties of importance include those that will enable the toner particles to acquire a positive charge or a negative charge; and carrier cores that will permit desirable flow properties in the developer reservoir present in the xerographic imaging apparatus. Also of value with regard to the carrier core properties are, for example, suitable magnetic characteristics that will permit magnetic brush formation in mag brush development processes; and also wherein the carrier cores possess desirable mechanical aging characteristics. Examples of carrier cores that can be selected include iron, steel, ferrites, such as copper, zinc, manganese, available from Steward Chemicals, magnetites, nickel, and mixtures thereof. Preferred carrier cores include ferrites, and sponge iron, or steel grit with an average particle size diameter of from between about 30 microns to about 200, and preferably from about 75 to about 95 microns.

Illustrative examples of copolymer coatings with surfactant coating thereover selected for the carrier particles of the present invention include coatings of methylmethacrylate and fluoroacrylates, or fluoromethacrylates, such as poly(methylmethacrylate-co- trifluoroethylacrylate), poly(methylmethacrylate-co-trifluoroethylmethacrylate), poly(methylmethacrylate-co-pentafluorophenylacrylate), poly(methylmethacrylate-co-pentafluorophenylmethacrylate), poly(methylmethacrylate-co-hexafluoroisopropylacrylate), poly(methylmethacrylate-co-hexafluoroisopropylmethacrylate), poly(methylmethacrylate-co-tetrafluoropropylacrylate), poly(methylmethacrylate-co-tetrafluoropropylmethacrylate), poly(methylmethacrylate-co-perfluorooctylacrylate), poly(methylmethacrylate-co-perfluorooctylmethacrylate), poly(methylmethacrylate-co-dodecafluoroheptylacrylate), poly(methylmethacrylate-co-dodecafluoroheptylmethacrylate), poly(methylmethacrylate-co-hexafluorobutylacrylate), poly(methylmethacrylate-co-hexafluorobutylmethacrylate), poly(methylmethacrylate-co-heptadecafluorodecylacrylate), and poly(methylmethacrylate-co-heptadecafluorodecylmethacrylate), containing from about 50 to 99 percent of methylmethacrylate and from about 1 to 50 percent of the fluorinated acrylate or methacrylate. Illustrative carrier tribos for poly(methyl-co-trifluoroethylmethacrylate) copolymer particles with 5 percent of poly(perfluorooctylacrylate) surfactant layer are provided in the following table.

| % Methylmethacrylate in Copolymer | % Trifluoroethyl-methacrylate in Copolymer | Carrier Tribo ($\mu$coul/g) |
|---|---|---|
| 98 | 2 | −11 |
| 75 | 25 | −39 |
| 60 | 40 | −65 |

Also, there results, in accordance with a preferred embodiment of the present invention, carrier particles of relatively constant conductivities of from between about $10^{-15}$ mho-cm$^{-1}$ to from about $10^{-9}$ mho-cm$^{-1}$ at, for example, a 10 volt impact across a 0.1 inch gap containing carrier beads held in place by a magnet; and wherein the carrier particles are of a triboelectric charging value of from −15 microcoulombs per gram to −70 microcoulombs per gram, these parameters being dependent on the coatings selected, and the percentage of polymer used as indicated hereinbefore.

Various effective suitable means can be used to apply the polymer coating to the surface of the carrier particles. Examples of typical means for this purpose include combining the carrier core material and the polymer by cascade roll mixing, or tumbling, milling, shaking, electrostatic powder cloud spraying, fluidized bed, electrostatic disc processing, and an electrostatic curtain. Following application of the polymer, heating is initiated to permit flowout of the coating material over the surface of the carrier core. The concentration of the coating material powder particles, as well as the parameters of the heating step, may be selected to enable the formation of a continuous film of the coating material on the surface of the carrier core, or permit only selected areas of the carrier core to be coated. When selected areas of the metal carrier core remain uncoated or exposed, the carrier particles will possess electrically conductive properties when the core material comprises a metal. The aforementioned conductivities can include various suitable values. Generally, however, this conductivity is from about $10^{-9}$ to about $10^{-17}$ mho-cm$^{-1}$ as measured, for example, across a 0.1 inch magnetic brush at an applied potential of 10 volts; and wherein the coating coverage encompasses from about 10 percent to about 100 percent of the carrier core.

Illustrative examples of finely divided toner resins selected for the developer compositions of the present invention include polyamides, epoxies, polyurethanes, diolefins, vinyl resins and polymeric esterification products of a dicarboxylic acid and a diol comprising a diphenol, and extruded polyesters as illustrated in U.S. Pat. No. 5,376,494, the disclosure of which is totally incorporated herein by reference. Specific vinyl monomers that can be used are styrene, p-chlorostyrene vinyl naphthalene, unsaturated mono-olefins such as ethylene, propylene, butylene and isobutylene; vinyl halides such as vinyl chloride, vinyl bromide, vinyl fluoride, vinyl acetate, vinyl propionate, vinyl benzoate, and vinyl butyrate; vinyl esters like the esters of monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalphachloracrylate, methyl methacrylate, ethyl methacrylate, and butyl methacrylate; acrylonitrile, methacrylonitrile, acrylamide, and the like. Also, styrene butadiene copolymers, mixtures thereof, and other similar known thermoplastic toner resins can be selected.

As one toner resin there can be selected the esterification products of a dicarboxylic acid and a diol comprising a diphenol, reference U.S. Pat. No. 3,590,000, the disclosure of which is totally incorporated herein by reference. Other preferred toner resins include styrene/methacrylate copolymers; styrenelbutadiene copolymers; polyester resins obtained from the reaction of bisphenol A and propylene oxide; and branched polyester resins resulting from the reaction of dimethylterephthalate, 1,3-butanediol, 1,2-propanediol and pentaerythritol.

Generally, from about 1 part to about 5 parts by weight of toner particles are mixed with from about 10 to about 300 parts by weight of the carrier particles prepared in accordance with the process of the present invention.

Numerous well known suitable pigments or dyes can be selected as the colorant for the toner particles including, for example, carbon black, nigrosine dye, lamp black, iron oxides, magnetites, and mixtures thereof. The pigment, which is preferably carbon black, should be present in a sufficient amount to render the toner composition highly colored. Thus, the pigment particles are present in amounts of from about 2 percent by weight to about 20, and preferably from about 5 to about 12 percent by weight, based on the total weight of the toner composition.

When the pigment particles are comprised of magnetites, which are a mixture of iron oxides ($FeO.Fe_2O_3$) including those commercially available as MAPICO BLACK®, they are present in the toner composition in an amount of from about 10 percent by weight to about 70 percent by weight, and preferably in an amount of from about 20 percent by weight to about 50 percent by weight.

The resin particles are present in a sufficient, but effective amount, thus when 10 percent by weight of pigment, or colorant such as carbon black is contained therein, about 90 percent by weight of resin material is selected. Generally, however, the toner composition is comprised of from about 85 percent to about 97 percent by weight of toner resin particles, and from about 3 percent to about 15 percent by weight of pigment particles such as carbon black.

Also encompassed within the scope of the present invention are colored toner compositions comprised of toner resin particles, carrier particles and as pigments or colorants, magenta, cyan and/or yellow particles, as well as mixtures thereof. More specifically, illustrative examples of magenta materials that may be selected as pigments include 1,9-dimethyl-substituted quinacridone and anthraquinone dye identified in the Color Index as Cl 60720, Cl Dispersed Red 15, a diazo dye identified in the Color Index as Cl 26050, Cl Solvent Red 19, and the like. Examples of cyan materials that may be used as pigments include copper tetra-4-(octaecyl sulfonamido) phthalocyanine, X-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, permanent yellow FGL, and the like. These pigments are generally present in the toner composition in an amount of from about 1 weight percent to about 15 weight percent based on the weight of the toner resin particles.

For further enhancing the positive charging characteristics of the toner compositions, and as optional components there can be incorporated herein charge enhancing additives inclusive of alkyl pyridinium halides, reference U.S. Pat. No. 4,298,672, the disclosure of which is totally incorporated herein by reference; organic sulfate or sulfonate compositions, reference U.S. Pat. No. 4,338,390, the disclosure of which is totally incorporated herein by reference; distearyl dimethyl ammonium sulfate, and other known charge additives, including negative charge additives, such as BONTRON E-88®, and similar aluminum complexes. These additives are usually incorporated into the toner in an amount of from about 0.1 percent by weight to about 20 percent by weight.

The toner composition of the present invention with an average volume size diameter of from about 5 to about 20 microns can be prepared by a number of known methods including melt blending the toner resin particles, and pigment particles or colorants of the present invention, followed by mechanical attrition. Other methods include those well known in the art such as spray drying, melt dispersion, dispersion polymerization and suspension polymerization. In one dispersion polymerization method, a solvent dispersion of the resin particles and the pigment particles are spray dried under controlled conditions to result in the desired product.

Also, the toner and developer compositions of the present invention may be selected for use in electrostatographic imaging and printing processes containing therein conventional photoreceptors, including inorganic and organic photoreceptor imaging members. Examples of imaging members are selenium, selenium alloys, and selenium or selenium alloys containing therein additives or dopants such as halogens. Furthermore, there may be selected organic photoreceptors, illustrative examples of which include layered photoresponsive devices comprised of transport layers and photogenerating layers, reference U.S. Pat. No. 4,265,990, the disclosure of which is totally incorporated herein by reference, and other similar layered photoresponsive devices. Examples of generating layers are trigonal selenium, metal phthalocyanines, metal free phthalocyanines, vanadyl phthalocyanines, titanyl phthalocyanines, bis perylenes, gallium phthalocyanines, and the like. As charge transport molecules there can be selected the aryl diamines disclosed in the '990 patent. Moreover, the developer compositions of the present invention are particularly useful in electrostatographic imaging processes and apparatuses wherein there is selected a moving transporting means and a moving charging means; and wherein there is selected a deflected flexible layered imaging member, reference U.S. Pat. No. 4,394,429 and 4,368,970, the disclosures of which are totally incorporated herein by reference; and such developers can be selected for digital imaging apparatuses such as the Xerox Corporation DOCUTECH™.

Images obtained with the developer compositions illustrated herein will, it is believed, possess acceptable solids, excellent halftones and desirable line resolution with acceptable or substantially no background deposits.

The following Examples are being provided to further illustrate the present invention, it being noted that these Examples are intended to illustrate and not limit the scope of the present invention. Parts and percentages are by weight unless otherwise indicated.

EXAMPLE I

A high pressure steel reactor charged with monomer was added under nonsupercritical conditions, and then the reactor was pressurized with carbon dioxide to supercritical conditions; the monomer was methyl methacrylate, 25 w/v percent, (the expression "w/v percent" is known and refers to the equivalent of kilograms/Literx 100™, so for example, 0.50 kilogram of material in a 1 liter reactor would be a loading of 50 w/v percent; in supercritical reactions the density of the supercritical fluid varies considerably with pressure, unlike water or organic solvents under nonsupercritical conditions. This means that the total weight loading of the reactor, which includes the carbon dioxide, is not usually constant but rather depends on the pressure. However, the reactor volume is known, thus w/v percent is selected), VAZO-64™ initiator obtained from E. I. DuPont (0.375 w/v percent) and a poly(1,1-dihydrofluorooctylmethacrylate) surfactant (6.25 w/v percent). The mixture was pressurized to approximately 200 (1 bar =1 atmosphere) bar with carbon dioxide and the reactor was heated to raise the temperature to 75° C. These conditions were maintained for 10 hours, after which the reactor was cooled to 25° C. and vented. During the aforementioned polymerization, stirring was maintained at 500 rpm. The product resulting was comprised of PMMA (polymethylmethacrylate) particles, approximately 1 micron in volume average diameter covered with a layer of poly(1,1-dihydrofluorooctylmethacrylate) approximately 0.2 micron thick. Yield of product was 85 to 90 percent. Optionally, the layer of poly(1,1-dihydrofluorooctylmethacrylate) can be removed by repeated flushing of the reactor 4 times with carbon dioxide after the polymerization, and prior to cooling and venting. Removal of the surfactant provides 1 micron diameter PMMA particles without a fluoropolymer layer on the surface. The above prepared product particles are suitable for use as carrier powder coatings in two component developers comprised of toner and carrier for xerographic imaging methods.

The carrier particles can be prepared by coating about 68,000 grams of a Toniolo atomized steel core, 120 microns in diameter, with 680 grams of the above prepared PMMA/poly(1,1-dihydrofluorooctylmethacrylate), and by mixing these components for 60 minutes in a Munson MX-1 Minimixer, rotating at 27.5 RPM. There resulted uniformly distributed and electrostatically attached, as determined by visual observation, on the carrier core the PMMA/poly(1,1-dihydrofluorooctylmethacrylate). Thereafter, the resulting carrier particles were metered into a rotating tube furnace at a rate of 105 grams/minute. This furnace was maintained at a temperature of 503° F. thereby causing the polymer to melt and fuse to the core.

A developer composition was then prepared by mixing 97.5 grams of the above prepared carrier particles with 2.5 grams of a toner composition comprised of 92 percent by weight of a styrene n-butylmethacrylate copolymer resin, 58 percent by weight of styrene, 42 percent by weight of n-butylmethacrylate, 10 percent by weight of carbon black, and 2 percent by weight of the charge additive cetyl pyridinium chloride. Thereafter, the triboelectric charge on the carrier particles was determined by the known Faraday Cage process, and there was measured on the carrier a charge of −68.3 microcoulombs per gram. Further, the conductivity of the carrier as determined by forming a 0.1 inch long magnetic brush of the carrier particles, and measuring the conductivity by imposing a 10 volt potential across the brush, was $10^{-15}$ mho-cm$^{-1}$. Therefore, these carrier particles were considered insulating.

EXAMPLE II

A high pressure reactor was charged with methyl methacrylate (20 v/w percent), trifluoroethylmethacrylate (5 w/v percent), VAZO-64™ initiator obtained from E. I. DuPont (0.375 w/v percent) and a poly(1,1-dihydrofluorooctylmethacrylate) surfactant (6.25 w/v percent). The mixture was pressurized to approximately 200 bar with carbon dioxide and the temperature was raised to 75° C. These conditions were maintained for 10 hours, after which the reactor was cooled to 25° C. and vented. During the polymerization, stirring was maintained. The product was comprised of particles of poly(methylmethacrylate-co-trifluoroethylmethacrylate) approximately 1 micron in diameter covered with a layer of poly(1,1-dihydrofluorooctylmethacrylate) about 0.2 micron thick. Yield was 80 to 90 percent. Optionally, the layer of poly(1,1-dihydrofluorooctylmethacrylate) can be removed by repeated flushing of the reactor with carbon dioxide after the polymerization, and prior to cooling and venting as illustrated in Example I.

EXAMPLE III

A high pressure reactor was charged with methyl methacrylate (20 v/w percent), VAZO-64 initiator obtained from DuPont (0.50 w/v percent), and a poly(1,1-dihydrofluorooctylmethacrylate) surfactant (6.25 w/v percent). The mixture was pressurized to approximately 350 bar with carbon dioxide and the temperature was raised to 60° C. These conditions were maintained for 6 hours. The reactor contents at this time were comprised of PMMA particles of about 1 micron diameter plasticized with carbon dioxide, and thus had a porous morphology. A second monomer, trifluoroethylmethacrylate (5 w/v percent), was then added to the reactor and the polymerization was continued another six hours. Stirring was maintained during the reaction. The reactor was then cooled to 25° C. and vented. The product was comprised of a polyblend of 80 percent PMMA particles of a porous nature in which the pores were filled with 20 percent of poly(trifluoroethylmethacrylate). The particles are approximately 1 micron in diameter and were covered with a layer of poly(1,1-dihydrofluorooctylmethacrylate) surfactant about 0.2 micron thick. Yield was about 90 percent. Optionally, the layer of poly(1,1-dihydrofluorooctylmethacrylate) can be removed by repeated flushing of the reactor with carbon dioxide after the polymerization, prior to cooling and venting as illustrated in Example I.

EXAMPLE IV

A high pressure reactor was charged with methyl methacrylate (20 v/w percent), VAZO-64 initiator obtained E. I. from DuPont (0.50 w/v percent), and a poly(1,1-dihydrofluorooctylmethacrylate) surfactant (6.25 w/v percent). The mixture was pressurized to approximately 350 bar with carbon dioxide and the temperature was raised to 60° C. These conditions were maintained for 6 hours. The reactor contents at this time were comprised of PMMA particles of about 1 micron diameter plasticized with carbon dioxide, and thus had a porous morphology. A second monomer, 1,1-dihydroperfluorooctylmethacrylate (5 w/v percent), was then added to the reactor and the polymerization was continued another six hours. Stirring was maintained during the reaction. The reactor was then cooled to 25° C. and vented. The product was comprised of a polyblend of 80 percent PMMA particles of a porous nature in which the pores were filled with 20 percent of poly(1,1-dihydroperfluorooctylmethacrylate). The particles are approximately 1 micron in diameter and were covered with a layer of poly(1,1-dihydrofluorooctylmethacrylate) surfactant about 0.2 microns thick. Yield was about 90 percent. Optionally, the layer of poly(1,1-dihydrofluorooctylmethacrylate) can be removed by repeated flushing of the reactor with carbon dioxide after the polymerization, prior to cooling and venting as illustrated in Example I.

EXAMPLE V

A high pressure reactor was charged with methyl methacrylate (20 v/w percent), VAZO-64™ initiator obtained from E. I. DuPont (0.375 w/v percent) and a poly(1,1-dihydrofluorooctylmethacrylate) surfactant (3.00 w/v percent). The mixture was pressurized to approximately 350 bar with carbon dioxide and the temperature was raised to 60° C. These conditions were maintained for 10 hours. Stirring was maintained throughout the polymerization. KYNAR 301F®, a powder of submicron fluoropolymer particles (mean diameter of approximately 0.25 micron) made by emulsion polymerization, was then added to the reactor (50 w/v percent) and the system was mixed for 4 hours. The reactor was heated to 130° C., and then cooled to 25° C. and vented. The reactor contents were classified to eliminate KYNAR® particles from the 4 micron particles. The product was comprised of a polymer-polymer composite of porous PMMA particles (85 in which the pores contained KYNAR 301F® particles (15 w/v percent). Since the reactor temperature was raised to 130° C., the KYNAR® particles are fused in the pores. The particles were approximately 4 microns in diameter and were covered with a layer of poly(1,1-dihydrofluorooctylmethacrylate) approximately 1.1 microns thick, which can optionally be removed by repeated flushing of the reactor with carbon dioxide after the polymerization, prior to cooling and venting as illustrated in Example I. The product particles were suitable for use as carrier powder coatings in two component developers for xerographic imaging and printing processes, reference Example I, and more specifically, the Xerox Corporation 5090.

EXAMPLE VI

A high pressure reactor was charged with methyl methacrylate (20 v/w percent), VAZO-64 initiator obtained from E. I. DuPont (0.375 w/v percent), and a poly(1,1-dihydrofluorooctylmethacrylate) surfactant (3.00 w/v percent). The mixture was pressurized to approximately 350 bar with carbon dioxide and the temperature was raised to 60° C. These conditions were maintained for 10 hours. Stirring was maintained throughout the polymerization. The reactor was then cooled to 20° C. and vented. The product, porous PMMA particles of approximately 4 microns diameter, was then mixed with an emulsion of submicron poly(trifluoroethylmethacrylate) particles with a mean diameter of about 0.1 micron. The emulsion contained 20 w/v percent of poly(trifluoroethylmethacrylate). The mass of poly(trifluoroethylmethacrylate) added was equal to the mass of porous PMMA particles. This mixture was then stirred vigorously for 4 hours at 800 rpm and then heated to 130° C. The product was comprised of a polymer-polymer composite of porous PMMA particles (80 w/v percent) in which the pores contained poly(trifluoroethylmethacrylate) (20 w/v percent). The poly(trifluoroethylmethacrylate) particles were fused inside the pores. The composite particles were approximately 4 microns in diameter. The mixture was then centrifuged to separate the 4 micron composite particles from the 0.1 micron poly(trifluoroethylmethacrylate) emulsion particles. The product was washed with 10 kilograms of water/kilogram product and dried in a fluid bed dryer. The product particles (with coating or without throughout) were suitable for use as carrier powder coatings in two component developers for xerographic imaging methods.

EXAMPLE VII

A high pressure reactor was charged with methyl methacrylate (20 v/w percent), VAZO-64™ initiator from DuPont (0.375 w/v percent), and a poly(1,1-dihydrofluorooctylmethacrylate) surfactant (6.25 w/v percent). The mixture was pressurized to approximately 350 bar with carbon dioxide and the temperature was raised to 60° C. These conditions were maintained for 10 hours. Stirring was maintained throughout the polymerization. Carbon black (mean diameter of about 0.01 micron) was then added to the reactor (50 w/v percent), and the system was mixed for 4 hours. The reactor was heated to 130° C., and then cooled to 25° C. and vented. The reactor contents were classified to eliminate carbon black particles from the 4 micron particles. The product was comprised of a conductive composite comprised of porous PMMA particles (85 w/v percent) in which the pores contained carbon black (15 w/v percent). Since the reactor temperature was raised to 130° C., the carbon black particles were fused in the pores. The composite particles were approximately 4 microns in diameter and were covered with a layer of poly(1,1-dihydrofluorooctylmethacrylate) of 1.2 microns in thickness, which can optionally be removed by repeated flushing of the reactor with carbon dioxide after the polymerization, and prior to cooling and venting, as illustrated in Example I. The product particles (with or without a covered layer throughout) were suitable for use as conductive carrier powder coatings in two component developers requiring conductive carriers. Carriers prepared following the procedure described in Example I had a conductivity of $10^{-9}$ mho-cm$^{-1}$.

EXAMPLE VIII

A high pressure reactor was charged with methyl methacrylate (20 v/w percent), VAZO-64™ initiator from DuPont (0.375 w/v percent), and a poly(1,1-dihydrofluorooctylmethacrylate) surfactant (6.25 w/v percent). The mixture was pressurized to approximately 350 bar with carbon dioxide and the temperature was raised to 60° C. These conditions were maintained for 10 hours. Stirring was maintained throughout the polymerization. Fumed tin oxide (mean diameter of about 0.2 micron) was then added to the reactor (50 w/v percent) and the system was mixed for 4 hours. The reactor was heated to 130° C., and then cooled to 25° C. and vented. The reactor contents were classified to eliminate tin oxide particles from the 4 micron particles. The product was comprised of a conductive composite of porous PMMA particles (85 w/v percent) in which the pores contained tin oxide (15 w/v percent). Since the reactor temperature was raised to 130° C., the tin oxide particles were fused in the pores. The composite particles were approximately 4 microns in diameter and were covered with a layer of poly(1,1-dihydrofluorooctylmethacrylate) about 1.2 microns thick, which can optionally be removed by repeated flushing of the reactor with carbon dioxide after the polymerization, prior to cooling and venting, as illustrated in Example I. The product particles were suitable for use as conductive carrier powder coatings in two component developers requiring conductive carriers. Carriers prepared following the procedure described in Example 1 had a conductivity of $10^{-9}$ mho-$cm^{-1}$.

Developer compositions can be prepared with the polymer product of Examples II through VIII by repeating the developer process of Example I and wherein Toniolo atomized steel core, 120 microns in diameter, was selected as the carrier core in each instance.

With further reference to the above Examples, the conductivity values were obtained as indicated herein. Specifically, these values were generated by the formation of a magnetic brush with the prepared carrier particles. The brush was present within a one electrode cell consisting of the magnet as one electrode and a nonmagnetic steel surface as the opposite electrode. A gap of 0.100 inch was maintained between the two electrodes and a 10 volt bias was applied in this gap. The resulting current through the brush was recorded and the conductivity was calculated based on the measured current and geometry.

More specifically, the conductivity in mho-$cm^{-1}$ was the product of the current, and the thickness of the brush, about 0.254 centimeter divided by the product of the applied voltage and the effective electrode area.

With insulating developers, there were usually obtained images of high copy quality with respect to both lines and halftones, however, solid areas were of substantially lower quality. In contrast, with conductive developers there were achieved enhanced solid areas with low line resolution and inferior halftones.

With respect to the triboelectric numbers in microcoulombs per gram, they were determined by placing the developer materials in an 8 ounce glass jar with 2.75 percent by weight toner compositions, placed on a Red Devil Paint Shaker and agitated for 10 minutes. Subsequently, the jar was removed and samples from the jar were placed in a known tribo Faraday Cage apparatus. The blow off tribo of the carrier particles was then measured.

Other embodiments and modifications of the present invention may occur to those of ordinary skill in the art subsequent to a review of the present application and the information presented herein; these embodiments and modifications, as well as equivalents thereof, are also included within the scope of this invention.

What is claimed is:

1. A process for the preparation of carrier powder polymer coatings consisting of the supercritical polymerization of two monomers and surfactant in a supercritical medium, and wherein the surfactant forms a layer on the polymer product and which surfactant layer is of a thickness of from about 0.05 to about 1.5 microns, and the powder polymer carrier coating is of a size of 0.05 to about 5 microns.

2. A process in accordance with claim 1 wherein the medium is carbon dioxide.

3. A process in accordance with claim 1 wherein said two monomers are comprised of a first monomer of methylmethacrylate, and a second monomer of a fluorinated monomer, thereby resulting in a copolymer.

4. A process in accordance with claim 1 wherein the surfactant is a substituted polyacrylate, or a substituted polymethylacrylate, and the polymer is a copolymer selected from the group consisting of poly(methylmethacrylate-co-trifluoroethylacrylate), poly(methylmethacrylate-co-trifluoroethylmethacrylate), poly(methylmethacrylate-co-pentafluorophenylacrylate), poly(methylmethacrylate-co-pentafluorophenylmethacrylate), poly(methylmethacrylate-co-hexafluoroisopropylacrylate), poly(methylmethacrylate-co-hexafluoroisopropylmethacrylate), poly(methylmethacrylate-co-tetrafluoropropylacrylate), poly(methylmethacrylate-co-tetrafluoropropylmethacrylate), poly(methylmethacrylate-co-perfluorooctylacrylate), poly(methylmethacrylate-co-perfluorooctylmethacrylate), poly(methylmethacrylate-co-dodecafluoroheptylacrylate), poly(methylmethacrylate-co-dodecafluoroheptylmethacrylate), poly(methylmethacrylate-co-hexafluorobutylacrylate), poly(methylmethacrylate-co-hexafluorobutylmethacrylate), poly(methylmethacrylate-co-heptadecafluorodecylacrylate), and poly(methylmethacrylate-co-heptadecafluorodecylmethacrylate).

5. A process in accordance with claim 1 wherein the surfactant is poly(methylmethacrylate-co-trifluoroethylmethacrylate).

6. A process in accordance with claim 1 wherein the surfactant is poly(methylmethacrylate-co-trifluoroethylmethacrylate), and forms a layer on the copolymer obtained after polymerization.

7. A process in accordance with claim 1 wherein the polymerization is accomplished at a temperature of from about 50° C. to about 250° C.

8. A process for the preparation of a carrier polymer coating consisting of the supercritical polymerization in carbon dioxide of two monomers and a surfactant, and wherein said coating is a polymer prepared by charging into a high pressure steel reactor from about 10 to 50 w/v percent of a monomer, about 10 to 50 w/v percent of a second monomer that is fluorinated, about 0.05 to 5 w/v percent of initiators, about 0 to 2.5 w/v percent of crosslinking agent, together with about 1 to 15 w/v percent of a surfactant; agitating the reactor from about 50 to 500 rpm; pressurizing the reactor to from about 50 to 300 bars with a supercritical fluid; heating the reactor to from about 50 to 250° C. for about 3 to 15 hours to effect polymerization; cooling the reactor to about 10 to 40° C.; venting the reactor to release the supercritical fluid, and discharging the reactor contents, which are comprised of copolymer particles of about 0.05 to 5 microns in diameter, with a weight average molecular weight of about 50,000 to 5,000,000; and containing a layer of surfactant with a thickness of from about 0.01 to 1.5 microns on the copolymer surface.

9. A process in accordance with claim 8 wherein the surfactant layer is of a thickness of from about 0.05 to about 1.5 microns, and the copolymer surfactant obtained is of a size diameter of from about 0.05 to about 5 microns.

10. A process for the preparation of polymer coatings for carrier particles utilizing supercritical polymerization of two monomers and surfactant in a supercritical medium of carbon dioxide, the improvement residing in preparing the polymer by charging into a high pressure steel reactor from about 10 to 50 w/v percent of a monomer, about 10 to 50 w/v percent of a second monomer that is fluorinated, about 0.05 to 5 w/v percent of initiators, about 0 to 2.5 w/v percent of crosslinking agent, together with about 1 to 15 w/v percent of a surfactant; agitating the reactor from about 50 to 500 rpm; pressurizing the reactor to from about 50 to 300 bars with a supercritical fluid; heating the reactor to from about 50 to 250° C. for about 3 to 15 hours to effect polymerization; cooling the reactor to about 10 to 40° C.; venting the reactor to release the supercritical fluid, and discharging the reactor contents, which are comprised of copolymer particles of about 0.05 to 5 microns in diameter, with a weight average molecular weight of about 50,000 to 5,000,000; and containing a layer of surfactant with a thickness of from about 0.01 to 1.5 microns on the copolymer surface.

* * * * *